Oct. 26, 1965   R. B. WARRICK   3,214,008
ATTACHING CONVEYOR PARTS
Filed June 2, 1964
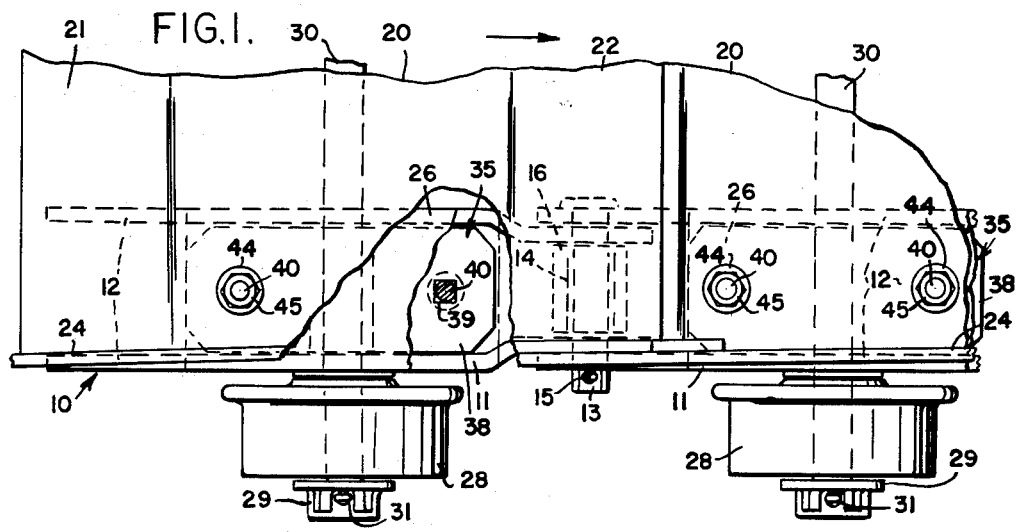
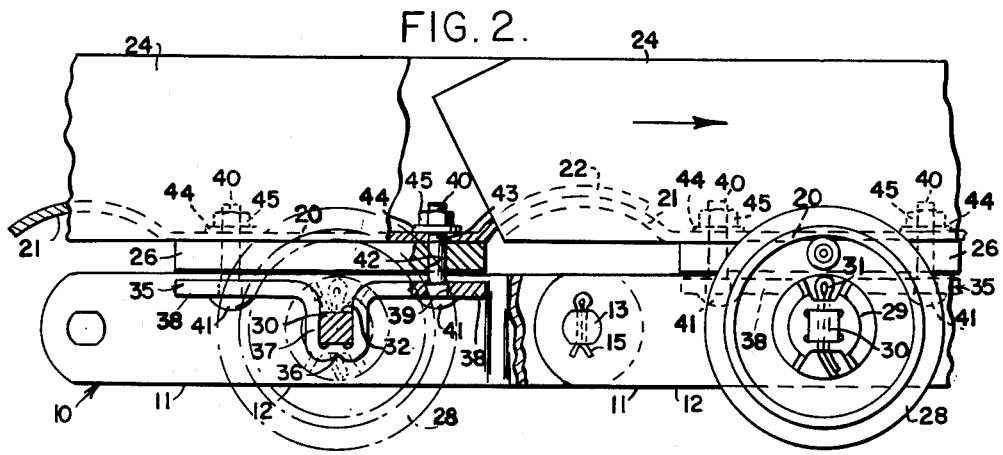
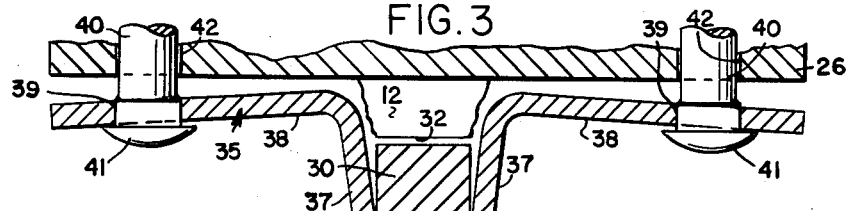
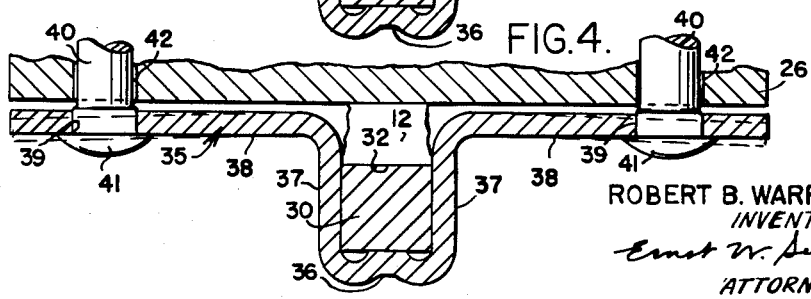
ROBERT B. WARRICK
INVENTOR
ATTORNEY

United States Patent Office

3,214,008
Patented Oct. 26, 1965

1

3,214,008
ATTACHING CONVEYOR PARTS
Robert B. Warrick, Milwaukee, Wis., assignor to Rex Chainbelt Inc., Milwaukee, Wis., a corporation of Wisconsin
Filed June 2, 1964, Ser. No. 372,031
4 Claims. (Cl. 198—196)

This invention relates, generally, to conveyors of the type wherein sprocket chains carry load transporting elements and more particularly to improved arrangements for securing transporting elements, supporting wheel axles or the like to the links of a conveyor chain.

A conveyor of the type to which the improved securing means of the present invention may be applied with advantageous results is shown in U.S. Patent No. 1,824,756 issued September 22, 1931 to George B. Welser. The conveyor there shown is of the pan or apron type that is supported upon flanged wheels running on spaced parallel tracks.

As shown in FIGS. 1, 2 and 3 of the drawing in Patent No. 1,824,756, each pair of flanged wheels is mounted on a square axle rod that extends through aligned openings in corresponding links of spaced parallel chains that operate over driving sprockets or the like for effecting movement of the conveyor along the trackway on its flanged wheels. The aligned openings are located at the center area of the sidebars of the chain links and are preferably square to receive the square axles.

The pans of the conveyor are constituted by a series of flat plates having curved margins which overlap along the arcuate joints between the links of the chains. The conveyor pans must be secured to the links firmly and likewise the axle rods must be held firmly in the chain link side-bars. As shown in the patent, the pans ordinarily heretofore have been secured by means of bolts and nuts while the axle rods have been clamped to the chain links by means of set screws. It has been difficult previously to insure the proper tightening of the set screws in particular in a manner to maintain the axle rods securely in the chain link openings because of the severe pounding impacts that are imposed upon the conveyor during use and the resulting movement and wearing action between the set screws and the axle rods.

Firm but resilient securement of the parts of the conveyor to the chain links is of the greatest importance, particularly since conveyors generally function as a part of a continuously operating large-scale process, and shutting down of the apparatus for adjustments or repairs of necessity involves considerable expense. Under these conditions, the slightest loosening of the bolts or set screws should have immediate corrective attention to avoid damage that would otherwise result from increased pounding and wearing of the loosening parts. Any slight loosening of the parts, however, is seldom observed or detected since the additional noise due to looseness is virtually unnoticeable because of the characteristically high general noise level in the area of the conveyor.

It is, therefore, a general object of the present invention to provide improved fastening means for securely connecting together the various parts of a chain conveyor.

Another object of the invention is to provide in a conveyor an improved somewhat resilient securement connection between the conveyor chain, the chain load carrying elements and the conveyor wheel axles.

Another object of the invention is to provide a conveyor securement member in the form of a resilient flat steel strap offset at its mid-section to constitute a U-shaped axle clamping element and extending longitudinally from the axle clamp to function as a pair of stiff springs that secure both the axle and the conveyor flight resilient to the chain link.

2

According to the present invention both the conveyor flight or pan and the transverse wheel axle of a conveyor are secured to the chain link by a sturdy strap or saddle having limited flexibility. The respective ends of the strap are provided with bolt holes for receiving clamping bolts that extend through similar aligned holes in the conveyor pan. The center portion of the strap is offset in U-shape to embrace the square axle rod. When the clamping bolts are drawn up, the U-shaped mid-portion of the saddle clamps upon the axle rod while the end portions of the saddle operate as stiff springs to clamp the axle against the chain link and likewise to clamp the chain link to the pan. After the bolts are tightened to their predetermined stressed condition, the resilient saddle maintains a constant pressure that holds the pan and the axle in engagement with the chain link while permitting slight twisting movements during operation without loosening the connection. Furthermore, the tension in the bolts maintains frictional engagement between the clamping nuts and the conveyor pan in a manner that prevents loosening of the nuts during operation. Accordingly, in assembling the conveyor it is merely necessary to tighten the clamping nuts sufficiently to tension the bolts properly whereupon the resilient action maintains the nuts tight and the various conveyor parts in snug cooperating relationship.

The accompanying drawing illustrates the best mode presently contemplated of carrying out the invention.

In the drawing:

FIGURE 1 is a fragmentary plan view showing part of a pan conveyor mounted on pivotally connected chain links, one corner of one conveyor pan having been broken away and sectioned to show part of the resilient strap that secures the pan and the chain links to the axle rod carrying the flanged rollers which support the conveyor;

FIG. 2 is a view in side elevation of the parts of the conveyor shown in FIGURE 1, one of the flange rollers and a portion of the chain link having been broken away to show the resilient securing strap;

FIG. 3 is an enlarged somewhat diagrammatic view in side elevation showing the resilient strap in its unstressed condition together with broken away and sectioned parts of the conveyor structure shown in FIG. 2; and FIG. 4 is a view similar to FIG. 3 but showing the resilient clamping strap in its final tensioned position as shown in FIG. 2, an intermediate partly tensioned position being represented by broken lines.

As more fully set forth in the previously mentioned Patent No. 1,824,756, a conveyor of the pan or apron type comprises essentially a pair of spaced parallel sprocket chains bridged by a series of transverse load carrying plate or pan elements secured respectively at their sides to corresponding links of the two chains. The respective leading and trailing edges of each pan element are curved on arcs generally concentric with the pivoting axes of the chain link joints and the curved edges of adjacent pans are overlapped to provide for articulation of the conveyor in running over supporting sprocket wheels without opening joints between the pans.

Referring now more particularly to the accompanying drawing and especially to FIGS. 1 and 2 thereof, the conveyor there shown in part to illustrate a practical application constituting one embodiment of the invention, is similar to the conveyor of Patent No. 1,824,756 in that it comprises a pair of identical spaced parallel chains 10 only one of which is shown. Each chain 10 is constituted by a series of pivotally connected chain links 11 the links each being formed by a pair of spaced parallel sidebars 12. In the particular chain shown, one end of each sidebar 12 is displaced inwardly in such manner that the inwardly displaced ends of the two sidebars of each link 11 fit between and are overlapped by the straight ends of the two side bars 12 of the adjacent link 11.

To join the adjacent chain links 11 for pivoting, headed pivot pins 13 are passed through aligned holes in the overlapping ends of the sidebars 12 in a manner to provide for articulation of the chain 10 in the plane of rotation of the supporting sprockets (not shown) that carry and drive the conveyor. The pivot pins 13 extend through and are free to rotate in bushings 14 which connect and space apart the inwardly displaced ends of the two sidebars of each link. To retain the pivot pins 13 in the sidebars 12, cotter pins 15 are passed through holes in the ends of the chain pins 13. Between the spaced sidebars 12 of the chain links, a roller 16 is journalled on each bushing 14 in position to cooperate with the teeth of the supporting sprockets in a well-known manner.

Each of a pair of corresponding links 11 of the two spaced parallel chains 10 carries one side of a transversely disposed load carrying pan or apron 20 that is the same at both sides and that extends from side to side of and forms the bridging bottom plate or flight of the conveyor. As best shown in FIG. 2, the trailing end or edge of the bottom of each pan 20 is curved to form an arcuate portion 21 approximately concentric with the pivot axis of the adjacent chain pin 13. Likewise, the leading margin or edge of the bottom of each pan 20 is similarly curved to form a slightly larger concentric arcuate portion 22 that is adapted to overlap the arcuate trailing end portion 21 of the preceding pan 20. In this manner leakage between the bottom plates of material being transported is prevented during articulation of the conveyor in running over sprockets or the like.

The respective sides of each transverse pan 20 are identical and each is provided with an upstanding side plate 24, the side plates being disposed substantially above the outer sidebars 12 of the respective supporting chain links 11. The side plates 24 of the pans 20 are inclined at a slight angle to the plane of operation of the chains 10 in direction to permit the trailing end of each side plate 24 to overlap and extend rearwardly outside of the leading end of the side plate on the following pan in a manner to prevent leakage between the side plates of the material being conveyed when articulation of the chain occurs.

As shown in FIGS. 1 and 2, rectangular spacer plates 26 interposed between the chains and the pans rest upon the top edges of the respective sidebars 12 of each chain link 11 and serve to support the corresponding side of the pan 20 in an elevated position to provide for proper articulation of the arcuate pan ends 21 and 22 when the conveyor runs over a sprocket. The weight of the conveyor and the load of material being conveyed is supported at each side of each pan 20 in a well-known manner by means of an outboard flanged track wheel 28 the wheels being arranged to operate along spaced parallel trackways (not shown). Each wheel or roller 28 is rotatably mounted on a bushing 29 that is fitted on and carried by the outer end of a rectangular or square axle bar or through rod 30 which extends from side to side of the conveyor and projects at both sides thereof. The respective bushings 29 are secured to the ends of the square cross bars or through rods 30 by means of cotter pins 31.

As best seen in FIG. 2, in the particular conveyor set forth, each square axle or through rod 30 passes through and is fitted in a corresponding rectangular or square hole 32 that is located in the geometrical center or median of each sidebar 12 of the chain links 11. By this arrangement, each successive pair of corresponding links 11 in the pair of spaced chains 10 are joined by one of the transverse through rods or axles 30 and carries one of the transverse pans 20, the axle rod 30 being supported to each end upon the outboard wheels 28. It is to be understood, however, that successive chain links need not be identical as in the particular structure shown in the drawing and that various different combinations of chain links, axles and pans may be utilized as required by the circumstances of operation of the conveyor.

It is apparent that the process of conveying heavy material upon a rapidly moving conveyor of this type, the conveyor is subjected to severe pounding forces of impacts and twisting or wrenching stresses of various kinds which wear and tend to loosen the connections between the links 11 and the square bar through rods 30 and also between the links 11 and the transverse pans 20 that are attached to them. In prior conveyors, this loosening action has required that the bolts and particularly the set screws be tightened periodically. Such difficulties heretofore experienced in maintaining satisfactory tight connections between the chain links and the other conveyor parts have been overcome, in accordance with this invention, by the utilization of an improved connector yoke or saddle 35 to provide resilient securement of the several elements to the chains. One of the connecting saddles 35 is associated with each chain link 11 and is of width to fit snugly between the sidebars 12 beneath the bridging spacer plate 26. The saddle 35 operates as a sturdy yoke or strap to clamp together tightly and securely although resiliently, the through rod 30, the chan link 11 and the adjacent side of the corresponding transverse pan 20.

The saddle 35 is constituted by a strip of flat plate material such as resilient and somewhat ductile steel that is offset and formed so that in its unstressed condition, it is shaped as shown in FIG. 3 of the drawing. Preferably, the offset portion of the strip is formed with a slight reverse bend 36 at its midlength that is flattened to engage the bottom of the square through rod 30 over a relatively large area throughout the width of the saddle.

The offset part of the plate forming the yoke or saddle 35 is bend upward along each side of the square through rod 30 in U-shape to form at its midsection generally vertical side elements 37 that are spaced slightly outward from the respective sides of the rod 30 and that flare outwardly a little and extend somewhat above the top surface of the rod. Each side of the saddle member 35 is then turned outwardly at substantially the right angle from the top of the U-shaped portion slightly above the top of the rod 30 to form outwardly extending and downwardly inclined end portions or arms 38 that are disposed generally longitudinally of the chain link 11, as shown in the drawing.

In the particular conveyor structure illustrated in the drawing, the steel plate or strap forming the saddle is about three-eighths of an inch thick and approximately four inches wide. The overall length of the saddle is a little less than seven inches and the U-shaped midportion is offset about one and one half inches.

Near its outer end, each outwardly extending arm 38 is provided with a bolt hole 39 that is preferably square for receiving an upwardly extending threaded bolt 40 provided on its lower end with a shaped head 41 which may be of the carriage bolt type fitting the square hole 39 in manner to restrain the bolt from turning. Alternatively, the bolts 40 many be of a different type or they may be threaded into or welded to the arms 38 or otherwise arranged to provide the desired clamping action.

As may be seen in FIGS. 1 and 2, the two bolts 40 pass upward through round holes 42 in the respective ends of the corresponding spacer plate 26 and also through aligned, similarly spaced attachment holes 43 in the adjacent side of the corresponding conveyor pan 20. The bolts 40 are long enough to extend upwardly through the holes 43 in the pan 20, when the saddle 35 is in the unstressed condition illustrated in FIG. 3, a sufficient distance to receive at their upper ends plain washers 44 and complementary threaded clamping nuts 45. When the nuts 45 are applied, the head 41 of each bolt 40 is drawn up into the square hole 39 and into engagement with the lower surface of the corresponding arm 38 of the saddle 35, as appears in FIG. 3.

In completing the assembly of the conveyor, the clamping nuts 45 associated with each yoke or saddle 35 are secured down upon the washers 44 and are then tightened by substantially equal increments, preferably by the use of any suitable torque wrench (not shown). As soon as the nuts 45 engage and press the washers 44 down upon the surface of the pan 20 they clamp the pan side down upon the corresponding spacer plate 26 which in turn is clamped down upon the top edges of the spaced sidebars 12 of the corresponding chain link 11. Simultaneously, the saddle 35 is urged upward by the bolt heads 41 thereby engaging the square through rod 30 with its flattened midportion and lifting the rod into clamping frictional engagement with the upper sides of the square openings 32 in the chain sidebars 12, the saddle 35 operating initially as a centrally loaded simple beam.

As the tension in the bolts 40 is increased by tightening the clamping nuts 45, the saddle 35 is deflected elastically throughout its length with the arms 38 bending upwardly and the vertical elements 37 bending inwardly toward the sides of the square through rod 30. As the tensioning of the bolts 40 and the loading of the saddle 35 is continued, the resulting elastic deformation of the saddle occurs largely at its midportion in the region of the square through rod 30 where the binding stresses are greatest.

With continued tensioning of the bolts 40, the U-shaped part at the central offset portion of the yoke 35 is caused to wrap around and conform in shape to the square through rod 30 with the vertical elements 37 of the saddle closing together and being brought into pinching or clamping engagement with the respective leading and trailing sides of the square rod, as shown in FIG. 4. As the saddle strip is deflected in wrapping around or embracing the through rod 30, it may be stressed beyond its elastic limit. If this should occur, the U-shaped part may undergo some plastic deformation or cold working in conforming to the shape of the rod 30.

When the U-shaped part of the saddle 35 conforms to the rod 30, the arms 38 extend in the positions indicated in broken lines in FIG. 4. In this position, the stiffness of the yoke 35 is considerably increased since each of the extending arms 38 now constitutes in effect a relatively short and rigid cantilever beam. Ordinarily, in practice a power operated torque limiting wrench is employed to tighten the nuts 45 when assembling the conveyor. When this increased stiffness of the saddle 35 is encountered, the torque wrench continues tightening the nuts alternately until the bolts 40 are brought up to their full working tension whereupon the torque wrench will no longer turn the nuts. This final tensioning of the bolts 40 operates to deflect the cantilevered arms 38 to the solid line horizontal position shown in FIG. 4 which is the final assembled position of the parts as shown also in FIG. 2.

In this final position, it is to be noted that the saddle 35 is so designed and proportioned that the cantilevered arms 38 ordinarily are not drawn up into clamping or seating engagement with the bottom of the spacer plate 26 but are preferably spaced separately therefrom a small distance such as one-sixteenth of an inch and are held thereby the stressed bolts 40 under resilient deflection to constitute in effect stiff cantilever plate springs. No harm will be done, however, if the arms 38 happen to be drawn up far enough to seat upon the spacer plates 26.

By this resilient arrangement, the bolts 40 are uniformly stressed under full working tension at all times and the nuts 45 and the plain washers 44 are held in frictional contact with each other and with the surface of the pan 20 in a manner to prevent loosening of the nuts during operation without the necessity of using lock washers or other nut retaining means. To make doubly sure that the nuts 45 will not loosen, the protruding threaded ends of the bolts 40 may be peened, but this is not ordinarily necessary or desirable.

With the central offset portion of the saddle 35 wrapped around and clamped upon the square through rod 30 as shown in the drawing, the rod is held securely over a large area of its surface against fore and aft movement and likewise against vertical movement relative to the chain sidebars 12. Furthermore, the frictional engagement between the saddle 35 and through rods 30 is such that endwise movement of the axle rod relative to the chain link likewise is prevented. On the other hand, the resilient action of the stressed cantilevered arms 38 permits a limited amount of relative movement between the parts of the conveyor to relieve excessive stresses that might otherwise result from unusual twisting movements and shocks encountered by the conveyor in the course of transporting material. Furthermore, the resilient nature of the connection afforded by the improved saddle 35 automatically takes up any looseness that might otherwise occur through slight wearing of the interconnected parts that may result from the relative twisting movements occurring during operation of the conveyor. Because of the resilience in the connections, this automatic takeup action is accomplished without significant reduction in the tension in the bolts 40 that clamp the parts together.

Since the saddle 35 is fitted between the sidebars 12 of the link 11 and extends longiudinally thereof, it serves to position the line of action of the chain 10 accurately relative to the corresponding side of the attached pan 20 when the conveyor is being assembled.

From the foregoing description of an exemplifying conveyor of the pan or apron type embodying the improved tachment means of the present invention and the accompanying explanation of the manner in which the attachment means is applied and operated, it is apparent that a new and novel arrangement has been provided by this invention for maintaining snug connections between the various parts of a chain conveyor. This improved result is achieved by utilizing a novel resilient connecting saddle that deflects in clamping upon the wheel carrying through rod and that maintains a constant tensioning force upon the bolts that secure it and the conveyor pan to the chain link. The novel resilient connection retains the nuts on the tensioning bolts without loosening and holds the conveyor pan and the through rod tightly against the chain link in spite of wracking stresses encountered during operation of the conveyor.

Although a specific example of a typical conveyor structure and of an illustrative improve resilient attachment arrangement has been set forth in detail herein by way of a full disclosure of a practical and useful embodiment of the invention, it is to be understood that the improved features herein disclosed may be incorporated in other conveyors or in somewhat different apparatus by those familiar with the art of conveying materials, without departing from the spirit and scope of this invention as defined in the subjoined claims.

The novel features of the invention having now been fully set forth and explained, I claim as my invention:

1. In a conveyor including a chain comprising a series of links and material supporting plates having spaced bolt holes therein, at least one of said links comprising spaced, parallel sidebars having aligned, square central apertures near the center of the link and a square rod fitted within and extending through said apertures; means for securing said rod within said apertures and the respective plate on top of said link comprising a strap having end sections provided with bolt holes aligned with the corresponding holes of the plate and bolts in said respective holes, said strap further having generally vertical clamping sections and a central section joining the *lower* ends of said clamping sections, said end sections projecting in opposite directions from the upper ends of said clamping sections and normally in slightly downwardly directions, said clamping sections being normally spaced to receive said rod therebetween and being of a length approximately the width of said rod whereby the tension of the bolts secures the central section against the underside of the rod and moves and secures the clamping sections against the sides of the rod and said rod and sections in effect form a unitary structure from which the end sections of the strap are cantilevered to maintain the bolts under constant tension which prevents their loosening.

2. The invention of claim 1 wherein said central section of the strap is provided with an elevated portion which directly engages the underside of the rod and the portions adjacent to the clamping sections are spaced from the corners of the rod and have a minimum radius.

3. In a conveyor of the type including spaced parallel articulated chains fitted with outboard supporting rollers and carrying material hauling plates, said chains being formed of chain links constituted by spaced parallel sidebars some having aligned transverse square openings therethrough, a square through rod fitted in and extending through said aligned square openings in said spaced parallel sidebars of one of said chain links, a conveyor supporting roller rotatably carried on the outwardly extending end of said square through rod, a flat material supporting conveyor bottom plate superimposed upon the top edges of said spaced parallel sidebars of said chain link, a clamping saddle of resilient steel strap material extending longitudinally of and fitted between said spaced parallel sidebars of said chain link, said clamping saddle comprising generally vertical clamping sections and a central section joining the lower ends of said clamping sections, said end sections projecting in opposite directions from the upper ends of said clamping sections and normally in slightly downwardly directions, said clamping sections being normally spaced to receive said rod therebetween with said central section engaging the underside of the rod and tension exerting clamping bolts interposed between each longitudinally extending end portion of said resilient clamping saddle and said superimposed conveyor bottom plate, the arrangement being such that when tension is exerted by said clamping bolts said resilent clamping saddle deflects as a beam and clamps upon both sides of said square through rod in manner to hold said rod securely while at the same time exerting a steady constant force to clamp both said square through rod and said flat conveyor plate securely to said sidebars of said chain link.

4. The invention of claim 3 wherein the conveyor further includes spacer plates interposed between the material hauling plates and the respective links, each of said spacer plates having spaced holes through which the corresponding bolts extend, said clamping saddle and bolts serving to firmly secure the said plates and respective links and rods against any relative movement in the normal operation of the conveyor.

References Cited by the Examiner
UNITED STATES PATENTS

| | | | |
|---|---|---|---|
| 1,824,756 | 8/22 | Welser | 198—196 |
| 1,911,380 | 5/33 | McFarlin | 248—316.5 |
| 2,924,809 | 2/60 | Wilson | 248—316.5 |

HUGO O. SCHULZ, *Primary Examiner.*

RICHARD E. AEGERTER, *Examiner.*